United States Patent
Boysen et al.

(10) Patent No.: US 7,250,232 B2
(45) Date of Patent: Jul. 31, 2007

(54) PROCESSING TECHNIQUES FOR THE FABRICATION OF SOLID ACID FUEL CELL MEMBRANE ELECTRODE ASSEMBLIES

(75) Inventors: Dane Boysen, Pasadena, CA (US); Calum Chisholm, Pasadena, CA (US); Sossina M. Haile, Altadena, CA (US); Tetsuya Uda, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 83 days.

(21) Appl. No.: 11/150,335

(22) Filed: Jun. 10, 2005

(65) Prior Publication Data
US 2006/0014068 A1 Jan. 19, 2006

Related U.S. Application Data

(60) Provisional application No. 60/578,652, filed on Jun. 10, 2004.

(51) Int. Cl.
*H01M 8/10* (2006.01)
*H01M 4/86* (2006.01)
*H01M 4/88* (2006.01)
*H01M 2/08* (2006.01)
*B05D 5/12* (2006.01)

(52) U.S. Cl. .............................. 429/33; 429/36; 429/42; 429/44; 427/115; 502/101

(58) Field of Classification Search .................. 429/33, 429/35, 36, 40, 42, 44, 45; 502/101; 427/115
See application file for complete search history.

(56) References Cited

U.S. PATENT DOCUMENTS

| 4,137,214 | A |   | 1/1979 | Sochalski |
|---|---|---|---|---|
| 4,380,575 | A | * | 4/1983 | Nakamura et al. ............ 429/13 |
| 4,594,297 | A | * | 6/1986 | Polak et al. .............. 429/33 X |
| 5,306,579 | A | * | 4/1994 | Shepard et al. .......... 429/44 X |
| 5,591,545 | A |   | 1/1997 | Miyashita et al. |
| 6,051,163 | A |   | 4/2000 | Kumberger et al. |
| 6,468,684 | B1 |   | 10/2002 | Chisholm et al. |
| 6,743,542 | B2 | * | 6/2004 | Krasij et al. .................. 429/36 |
| 7,125,621 | B2 | * | 10/2006 | Haile et al. ................... 429/33 |

(Continued)

FOREIGN PATENT DOCUMENTS

JP        63239781 A    10/1988

(Continued)

OTHER PUBLICATIONS

Boysen, Dane A. et al.; "Polymer Solid Acid Composite Membranes for Fuel-Cell Applications"; 2000, Journal of the Electrochemical Society, vol. 147, No. 10, pp. 3610-3613.

(Continued)

*Primary Examiner*—Stephen J. Kalafut
(74) *Attorney, Agent, or Firm*—Townsend and Townsend and Crew LLP

(57) ABSTRACT

Processes, techniques, and compositions used to fabricate high performance solid acid fuel cell membrane electrode assemblies are disclosed. The techniques include preparing the solid acid electrolyte material, depositing the electrolyte membrane, depositing the electrocatalyst layer, preparing the electrodes, fabricating the gas seals, and constructing the membrane electrode assembly.

59 Claims, 9 Drawing Sheets

U.S. PATENT DOCUMENTS

2002/0031695 A1     3/2002     Smotkin
2002/0034677 A1*    3/2002     Kawahara .................... 429/44

FOREIGN PATENT DOCUMENTS

JP             09-000924       *    1/1997

OTHER PUBLICATIONS

Chisholm, Calum R.I. et al.; "Structure and thermal behavior of the new superprotonic conductor $Cs_2(HSO_4)(H_4PO_4)$"; 1999, Acta Cryst., vol. B55, pp. 937-946.

Chisholm, Calum R.I. et al.; "Superprotonic behaviof of $Cs_2(HSO_4)(H_2PO_4)$—a new solid acid in the $CsHSO_4$- $CsH_2PO_4$ system"; 2000, Solid State Ionics, vol. 136-137, pp. 229-241.

Chisholm, Calum R.I. et al.; "Superprotonic Phase Transition in $CsH(PO_3H)$"; 2002, Chem. Mater., vol. 14, pp. 3889-3893.

Chisholm, Calum R.I. et al.; Synthesis, Structure, and Properties of Compounds in the Na $HSO_4$-Cs $HSO_4$ System. 1. Crystal Structures of $Cs_2Na(HSO)_3$ and $CsNa_2(HSO_4)_3$; 2001, Chem. Mater., vol. 13, pp. 2574-2583.

Chisholm, Calum R.I. et al.; "Synthesis, Structure, and Properties of Compounds in the Na $HSO_4$-Cs $HSO_4$ System. 2. The Absence of Superprotonic Transitions in $Cs_2Na(HSO_4)_3$ and $CsNa_2(HSO_4)_3$"; 2001, Chem. Mater., vol. 13, pp. 2909-2912.

Gargouri, M. et al.; Phase Transitions and Electrical Properties of $CsH(SO_4)_{0.76}(SeO_4)_{0.24}$ mixed crystals; Solid State Ionics; Oct. 1997; vol. 100, Nos. 3,4, pp. 225-232.

Haile, S.M., "Hydrogen-Bonding and Phase Transitions in Proton-Conducting Solid Acids", Mat. Res. Soc. Symp. Proc. 547 (1999), pp. 315-326.

Haile, S.M., "Single-crystal neutron diffraction study of $\beta\text{-}Cs_3(HSO_4)_2[H_{2-x}(S_xP_{1-x})O_4]$ (x~0.5) at 15 K"; 1999, Acta Cryst., vol. B55, pp. 285-296.

Haile, S.M., "Solid acids as fuel cell electrolytes"; 2001, Nature, vol. 410, pp. 910-913.

Haile, S.M., et al.; "Structure and Vibrational Spectrum of $\beta\text{-}Cs_3(HSO_4)_2[H_{2-x}(P_{1-x}S_x)O_4]$ (x~0.5), a New Superprotonic Conductor, and a Comparison with x-$Cs_3(HSO_4)_2(H_2PO_4)$"; 1998, Journal of Solid State Chemistry, vol. 139, pp. 373-387.

Haile, S.M., et al.; "X-Ray Diffraction Study of $Cs_5(HSO_4)_3(H_2PO_4)_2$, a New Solid Acid with a Unique Hydrogen-Bond Network"; 1998, Journal of Solid State Chemistry, vol. 140, pp. 251-265.

Lavrova, et al., "Disordering of Pentacesium Trihydrogen Tetrasulfate in $Cs_5H_3(SO_4)_4$-$SiO_2$ Composite Proto Electrolytes," Inorganic Materials, 2002, vol. 38, No. 11, pp. 1172-1177.

Mhiri, T., "Hydrogen Bonding in $Cs_{1-x}M_xHSO_4$ Protonic Conductors", Solid State Ionics 61 (1-3) 1993, pp. 187-191.

Politva, T.I., et al., "Ethylene Hydrogenation in Electrochemical Cell with Solid Proton-Conducting Electrolyte," Reaction Kinetics and Catalysis Letters, 41(2), 1990, pp. 321-326.

Ponomareva, et al., "Composite protonic solid electrolytes in $CsHSO_4$-$SiO_2$ system," Solid State Ionics, 1996, 90, pp. 161-166.

Ponomareva, et al., "Effect of $SiO_2$ morphology and pores size on the proton nanocomposite electrolytes properties," Solid State Ionics, 1999, 119, pp. 295-299.

Ponomareva, et al., "The influence of heterogeneous dopant porous structure on the properties of protonic solid electrolyte in the $CsHSO_4$-$SiO_2$ system," Solid State Ionics, 1999, 118, pp. 317-323.

Ponomareva, et al., "Composite protonic electrolytes in the system $(NH_4)_3H(SO_4)_2$-$SiO_2$," Solid State Ionics, 2001, 145, pp. 205-210.

Ponomareva, et al., "The investigation of disordered phases in nanocomposite proton electrolytes based on $MeHSO_4$ (Me=Rb,Cs,K)," Solid State Ionics, 2001, 145, pp. 197-204.

* cited by examiner

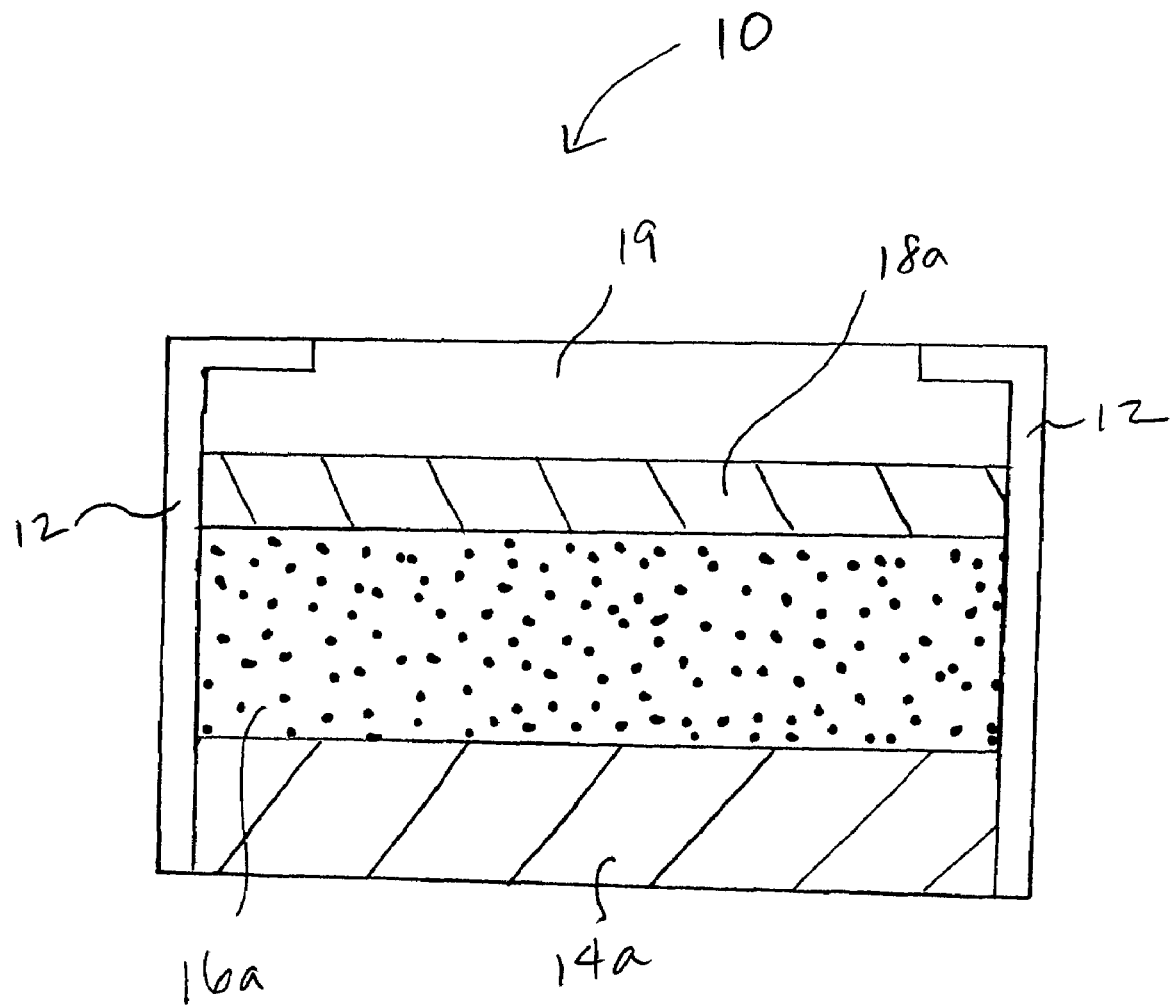

PROCESSING TECHNIQUES FOR THE FABRICATION OF SOLID ACID FUEL CELL MEMBRANE ELECTRODE ASSEMBLIES

CROSS-REFERENCE TO RELATED APPLICATION(S)

This application claims the benefit of Provisional Application Ser. No. 60/578,652, filed Jun. 10, 2004, entitled PROCESSING TECHNIQUES FOR THE FABRICATION OF SOLID ACID FUEL CELL MEMBRANE ELECTRODE ASSEMBLIES, the entire content of which is incorporated herein by reference.

FIELD OF THE INVENTION

The present invention is directed to processes, techniques and compositions for fabricating solid acid fuel cell membrane electrode assemblies, and more specifically to techniques for preparing solid acid electrolyte materials, depositing electrolyte membranes, depositing electrocatalyst layers, preparing electrodes, fabricating gas seals, and constructing membrane electrode assemblies for solid acid fuel cells.

BACKGROUND OF THE INVENTION

Research has recently focused on developing viable alternatives to combustion engines. Their increased efficiency and decreased generation of pollutants make fuel cells a particularly attractive alternative. Fuel cells generate electricity through an electrochemical reaction of fuel with oxygen. The fuel used may vary, but can be any of hydrogen, methanol, ethanol, methane, butane, gasoline, diesel, etc. The oxygen needed for the reaction is normally obtained from air.

There are several types of fuel cells, each primarily identified by the electrolyte membrane used. The most common fuel cells are alkaline fuel cells (AFCs), phosphoric acid fuel cells (PAFCs), polymer electrolyte membrane fuel cells (PEMFCs), molten carbonate fuel cells (MCFCs), and solid oxide fuel cells (SOFCs). Each of these fuel cells has unique capabilities and limitations.

A new class of fuel cells has recently been developed. These fuel cells are known as solid acid fuel cells (SAFCs) and utilize a superprotonic solid acid electrolyte such as $CsH_2PO_4$ (cesium dihydrogen phosphate or CDP) to conduct protons. These solid acid electrolytes and solid acid fuel cells are described in U.S. Pat. No. 6,468,684, entitled PROTON CONDUCTING MEMBRANE USING A SOLID ACID, the entire contents of which are incorporated herein by reference, in co-pending U.S. patent application Ser. No. 10/139,043, entitled PROTON CONDUCTING MEMBRANE USING A SOLID ACID, the entire contents of which are also incorporated by reference and in co-pending U.S. patent application Ser. No. 11/095,464, entitled DIRECT ALCOHOL FUEL CELLS USING SOLID ACID ELECTROLYTES, the entire contents of which are also incorporated herein by reference.

SAFCs have many advantages. Among these advantages are the ability to operate at intermediate temperatures, i.e. about 150 to about 350° C. Operation at these temperatures enables use of less expensive catalysts and ancillary component materials. Also, the solid acids are used in their solid state, enabling the design of simple and robust fuel cell systems. These advantages make SAFCs an economically attractive alternative to other known fuel cell types.

A typical fuel cell membrane electrode assembly (MEA) comprises an electrolyte membrane sandwiched between anode and cathode electrocatalyst layers and electrode gas diffusion layers, as shown in FIG. 1. SAFCs also utilize this MEA construction. The superprotonic solid acid electrolyte membranes distinguish SAFCs from other fuel cells.

SUMMARY OF THE INVENTION

The present invention is directed to processes, techniques and compositions for fabricating high performance solid acid fuel cell membrane electrode assemblies. In one embodiment of the present invention, a process for fabricating a solid acid fuel cell membrane electrode assembly includes techniques for preparing solid acid electrolyte materials, depositing electrolyte membranes, depositing electrocatalyst layers, preparing electrodes, fabricating gas seals, and constructing MEAs for solid acid fuel cells.

The solid acid electrolyte material is selected from the group consisting of chemical compounds represented by Formula 1 below, chemical compounds represented by Formula 2 below, and mixtures thereof.

$$M_a H_b (XO_t)_c \quad \text{Formula 1:}$$

$$M_a H_b (XO_t)_c \cdot nH_2O \quad \text{Formula 2:}$$

In both Formula 1 and Formula 2, M is selected from the group consisting of Li, Be, Na, Mg, K, Ca, Rb, Sr, Cs, Ba, Tl, $NH_4^+$, $Cu^+$, and mixtures thereof, X is selected from the group consisting of Si, P, S, As, Se, Te, Cr, Mn, and mixtures thereof, and a, b, c, n and t are rational numbers.

These solid acids, when used in fuel cell applications, exhibit superprotonic phases. A superprotonic phase is one in which the solid has disorder in its crystal structure and very high proton conductivity.

BRIEF DESCRIPTION OF THE DRAWINGS

These and other features and advantages of the present invention will be better understood by reference to the following detailed description when considered in conjunction with the accompanying drawings wherein:

FIG. 1b is a schematic depicting a half cell of a fuel cell membrane electrode assembly (MEA) according to one embodiment of the present invention;

DETAILED DESCRIPTION OF THE INVENTION

In one embodiment of the present invention, a process for fabricating a high performance solid acid fuel cell membrane electrode assembly comprises preparing an electrolyte material, forming an electrolyte layer composition, depositing an electrolyte layer, forming an electrocatalyst layer composition, preparing the catalyst layer, depositing a catalyst layer, and fabricating gas seals.

I. Electrolyte Preparation

In one embodiment, the electrolyte is prepared by first forming submicron-sized particles of a solid acid material. The solid acid electrolyte material is selected from the group consisting of chemical compounds represented by Formula 1 below, chemical compounds represented by Formula 2 below, and mixtures thereof.

$$M_a H_b (XO_t)_c \quad \text{Formula 1:}$$

$$M_a H_b (XO_t)_c \cdot nH_2O \quad \text{Formula 2:}$$

In both Formula 1 and Formula 2, M is selected from the group consisting of Li, Be, Na, Mg, K, Ca, Rb, Sr, Cs, Ba, Tl, $NH_4^+$, $Cu^+$, and mixtures thereof, X is selected from the group consisting of Si, P, S, As, Se, Te, Cr, Mn, and mixtures thereof, and a, b, c, n and t are rational numbers. One nonlimiting example of a suitable solid acid material is $CSH_2PO_4$.

These solid acids, when used in fuel cell applications, exhibit superprotonic phases. A superprotonic phase is one in which the solid acid has disorder in its crystal structure and very high proton conductivity.

Figure 2:
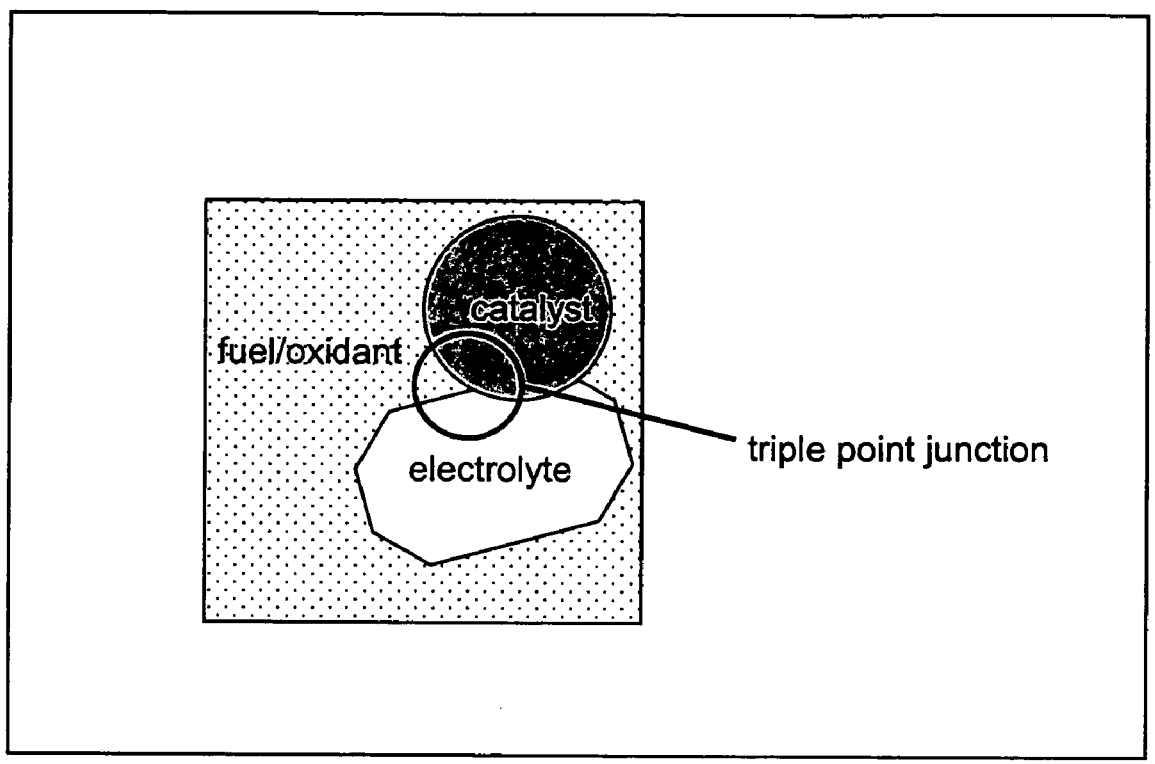
FIG. 2 is a schematic depicting a fuel cell electrocatalyst layer triple point junction according to one embodiment of the present invention.

The sub-micron sized particles of the solid acid material have sizes ranging from about 10 nm to about 0.1 microns, preferably from about 10 to about 100 nm. These sub-micron sized solid acid particles are useful for the fabrication of fuel cells. These particles enhance the performance of the electrocatalyst layer and enable processing of the electrolyte layer via painting or slurry casting. FIG. 2 shows a triple point junction, i.e. a junction between the catalyst, the electrolyte, and the fuel/oxidant. Maximization of the number of triple point junctions creates a high performance electrocatalyst layer. Maximization of the number of triple point junctions is achieved by maximizing the surface areas of the catalyst and the electrolyte. Surface area is maximized by forming very small particles, i.e. particles having particle sizes ranging from about 10 to about 100 nm. For example, the submicron sized electrolyte particles described above are useful for preparing paints or slurries (particles suspended in volatile solvents) for preparing ultra-thin electrolyte layers.

Preparation of these submicron sized solid acid differs from traditional ceramic processing methods due to the water solubility of most solid acids. According to one embodiment, the submicron sized solid acid particles are prepared according to a solvent injection method. In this method, fine particles are prepared by first dissolving the solid acid material in water so that the water is saturated or supersaturated with the solid acid material. The saturation limit depends on the solid acid used, but ranges from about 10 moles water per mole solid acid to about 50 moles water per mole solid acid at room temperature. The saturated or supersaturated aqueous solution is then injected into a turbulent, slightly polar solvent, in which the solid acid is not soluble, such as methanol, ethanol, isopropanol, benzene, toluene or acetone.

In one embodiment, an ultra-sonicator is used to ensure that the solvent is highly turbulent upon injection of the saturated solid acid solution. This results in massive precipitation of the solid acid out of the aqueous solution. After one day or longer the particles settle in the solvent. The settled solution is then decanted between about 1 to about 5 times with a slightly polar solvent, such as methanol, ethanol, butanol or isopropanol. The settled solution is then decanted between about 1 to about 5 times with a non-polar solvent, such as toluene or benzene. These decantings remove excess water to prevent agglomeration and growth of solid acid crystallites.

Figure 3:
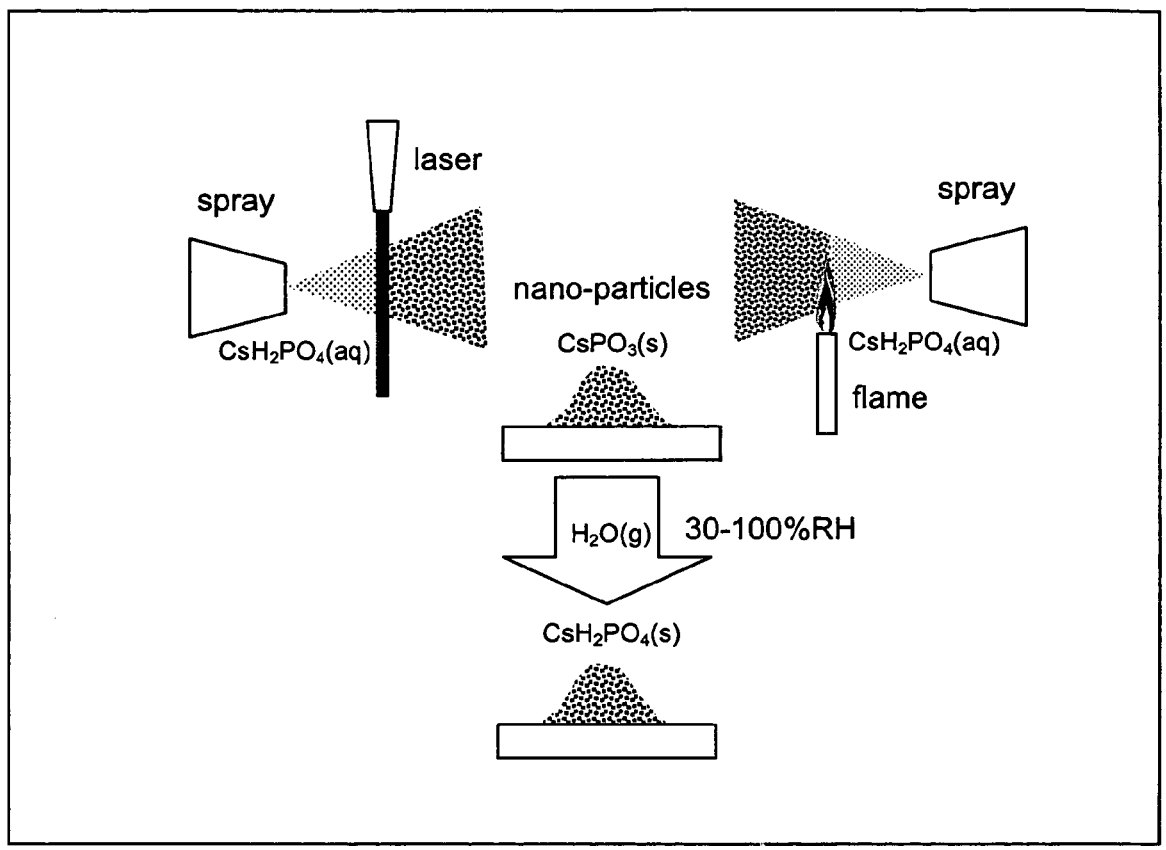
FIG. 3 is a schematic depicting a method of forming a solid acid electrolyte material according to one embodiment of the present invention.

In an alternative embodiment, laser and flame pyrolysis are used to produce nano-sized solid acid particles. In this process, aqueous solutions of particles or dissolved precursors are sprayed through a laser beam or flame, as shown in FIG. 3. However, solid acids, such as CDP, cannot be synthesized directly by laser or flame pyrolysis because they become dehydrated by the heat of the process. For example, CDP reacts with heat in the following reaction:

$$CsH_2PO_4 + \text{heat} \rightarrow CsPO_3 + H_2O$$

Therefore, the solid acid is prepared by placing the resulting nano-sized particles (reaction product of the solid acid and heat), e.g. $CsPO_3$, in an atmosphere having a relative humidity greater than about 30% or a water partial pressure greater than about 0.3 atm, and a temperature ranging from about 25 to about 200° C. The particles of the reaction product are allowed to stand in the humid atmosphere for a length of time ranging from about 1 hour to about 1 day, preferably from about 1 hour to about 10 hours. Placing the reactant product in this environment will effect a reverse reaction, hydrating the particles and reforming the solid acid electrolyte. For example, $CsPO_3$ reacts with the humidity in the following reaction:

$$CsP_3 + H_2O \rightarrow CsH_2PO_4$$

The electrolyte particles may also be prepared according to any other methods known in the art, as described in Provisional Application No. 60/578,652, entitled PROCESSING TECHNIQUES FOR THE FABRICATION OF SOLID ACID FUEL CELL MEMBRANE ELECTRODE ASSEMBLIES, filed Jun. 10, 2004, the entire content of which is incorporated herein by reference. For example, the electrolyte particles may be prepared by spraying using an air assisted sprayer, an ultra-sonic sprayer or other similar device. Also, the particles can be prepared by milling them to the desired particle size.

II. Electrolyte Layer Deposition

Deposition of the electrolyte in ultra-thin layers on the anode or cathode (substrate) creates high performance SAFC MEAs. Deposition of an ultra-thin film solid acid electrolyte can be effected by creating a solution, slurry, or gel of a solid acid in a suitable solvent, e.g., methanol, ethanol, isopropanol, toluene, or benzene. Alternatively, melts, dry powders, or saturated solutions of the solid acid in water can be used. Deposition may be achieved by mechanical dispersion, slurry casting, or spray processing.

A. Mechanical Dispersion

Figure 4:
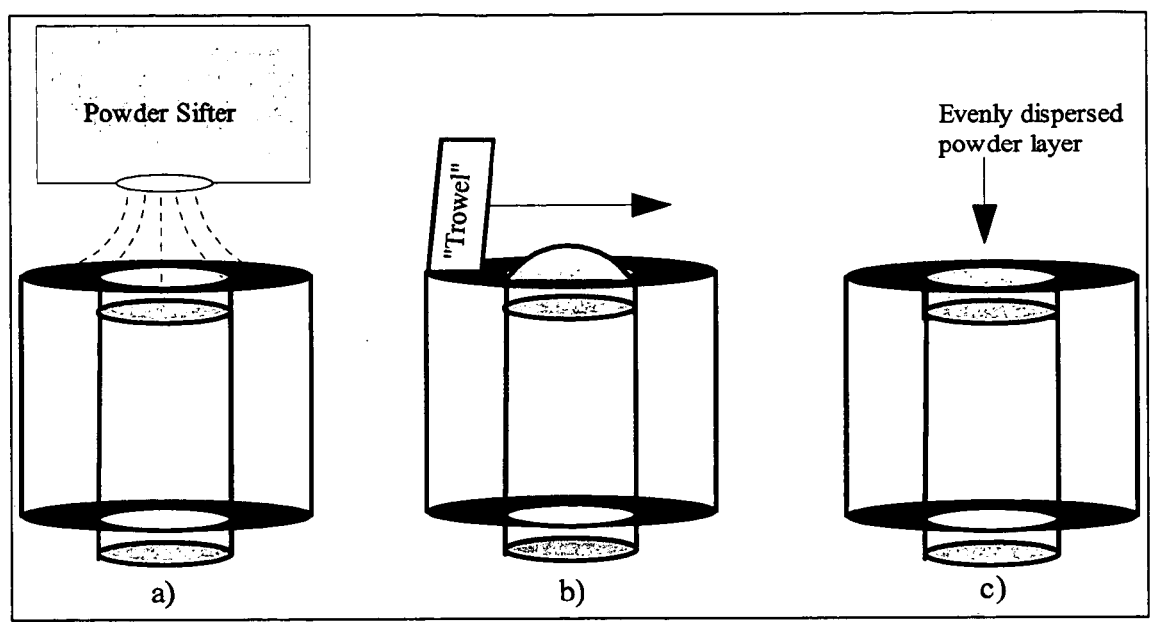
FIG. 4 is a schematic depicting a method of depositing an electrolyte layer according to one embodiment of the present invention.

To mechanically disperse a solid acid electrolyte, the electrolyte powder, prepared as described above, is dispersed over an electrode. As shown in FIG. 4, the powder is dispersed by first sifting the powder onto the electrode to achieve a fairly even distribution. As used, the term "sifting" means that the powder is either scattered onto the electrode or that the powder is passed through a sieve onto the electrode. Then, the dispersed electrolyte powder is further distributed over the electrode surface by leveling the powder by any suitable means, such as with a flat edge, such as a trowel. This leveling provides a more evenly distributed electrolyte layer. The leveled electrolyte powder is then flattened by any suitable means, such as with a hard, flat surface. For example, the powder may be flattened by the hard, flat surface of the plunger of a die, or the platen of a press. This process of sifting, leveling and flattening can be repeated as desired to achieve the desired electrolyte thickness and/or to decrease permeability of the electrolyte layer to fuel cell gases.

B. Slurry Casting

Figure 5:
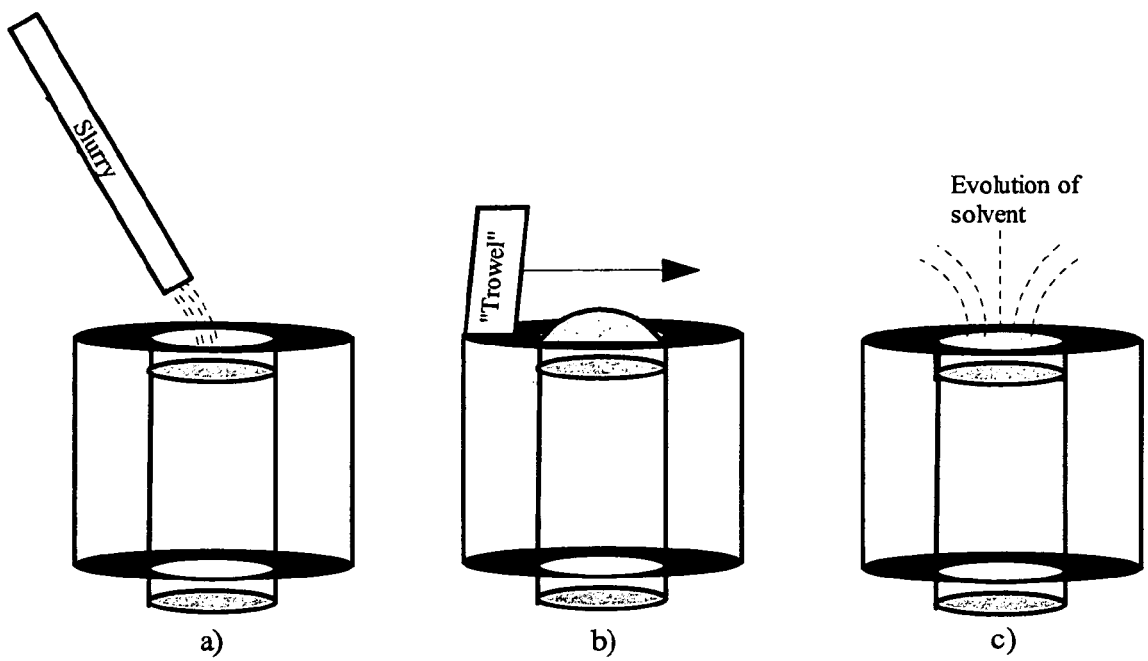
FIG. 5 is a schematic depicting a method of depositing an electrolyte layer according to an alternative embodiment of the present invention.

As shown in FIG. 5, to slurry cast a solid acid electrolyte layer, an electrolyte slurry is first prepared by mechanically mixing the electrolyte powder, prepared as described above, with a suitable organic solvent. Nonlimiting examples of suitable organic solvents include oxygenated solvents including alcohols, glycols, ethers, ketones and esters, hydrocarbon solvents including aliphatics and aromatics, and halogenated or chlorinated solvents. Exemplary organic solvents include methanol, ethanol, propanol, isopropanol, butanol, ethyl ether, methyl ketone, ethyl acetate, acetone, hexane, kerosene, mineral spirits, toluene, benzene, methyl chloride, perchloroethylene, trichloroethylene, and the like. During this process, the electrolyte powder is mechanically ground in the organic solvent until a desired residence time is achieved. As used, "residence time" means the length of time the powder particles remain evenly dispersed in the solvent and do not settle out of the solvent. Here, the residence time ranges from about 1 minute to about 1 day. The agitated slurry is then deposited onto the electrode or other hard and flat surface and the solvent is allowed to evolve. The slurry may be deposited by pouring, tape casting, ink-jet-like deposition, or the like. This process creates an evenly dispersed, dry layer of electrolyte powder. If necessary, the slurry layer may then be evenly distributed on the electrode by leveling the slurry layer with a flat edge.

Thin electrolyte layers can also be formed from solid acid gels. These electrolyte gels are formed by dispersing fine solid acid powders having from about a 0.01 to about a 1 micron particle size, in a polar solvent such as methanol, ethanol or isopropanol. This dispersion is then mixed into a non-polar solvent such as benzene or toluene. In order to form a stable gel, the dispersion is decanted multiple times with the non-polar solvent. As used, a "stable gel" is one in which particles remain in gel form without condensation for hours to days. The gel is then deposited onto the electrode or other hard and flat surface and the solvent is allowed to evolve. The gel may be deposited by pouring, tape casting, ink-jet-like deposition, or the like. This process creates an evenly dispersed, dry layer of electrolyte powder. If necessary, the gel layer may then be evenly distributed on the electrode by leveling the gel layer with a flat edge.

Similarly, an aqueous solution of a water soluble solid acid can be cast onto the desired substrate. The water is then allowed to evolve, creating an evenly dispersed electrolyte layer. The particle (crystallite) size is controlled by the rate of water evaporation. Faster water evaporation rates yield smaller electrolyte particles.

C. Spray Processing

Figure 6:
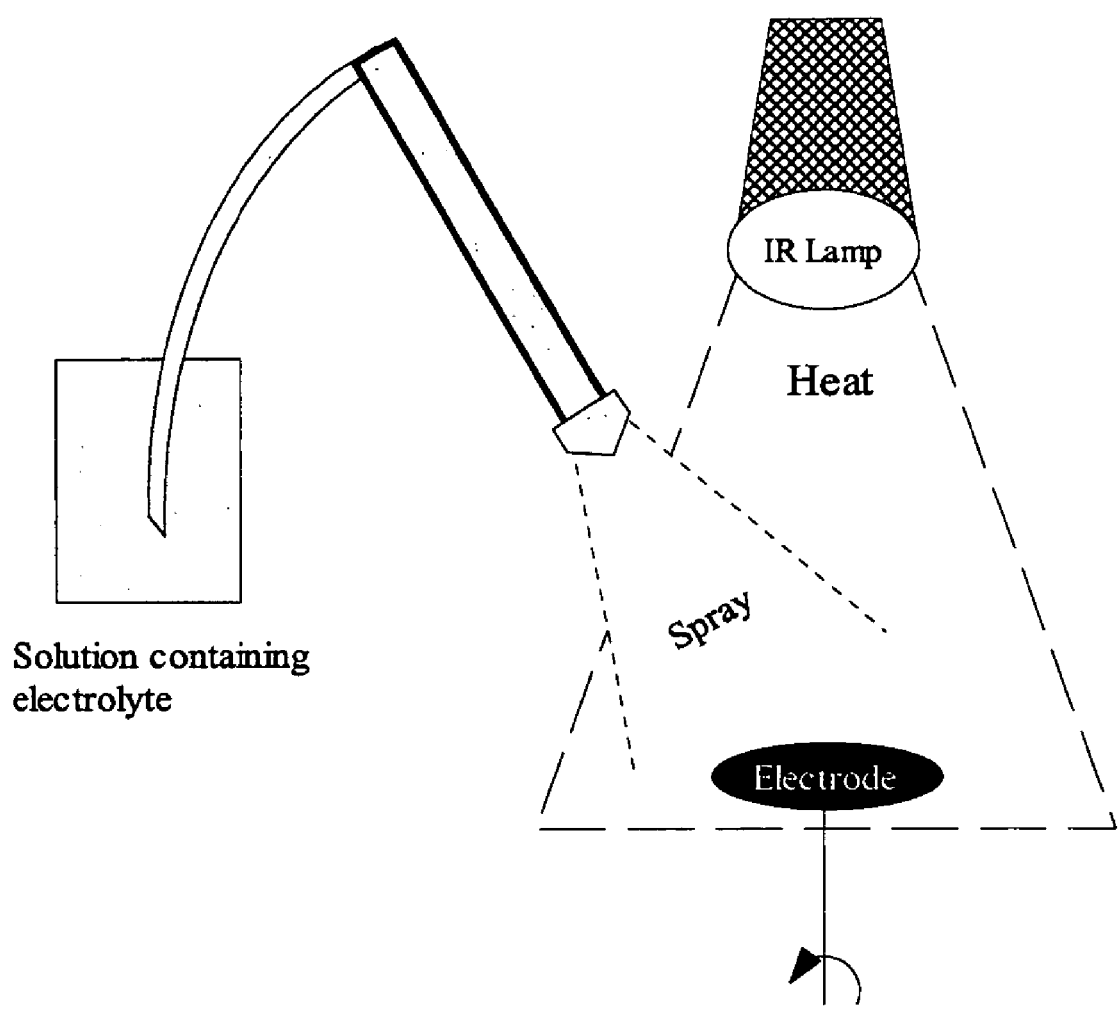
FIG. 6. is a schematic depicting a method of depositing an electrolyte layer according to yet another embodiment of the present invention.

Thin electrolyte layers can also be deposited by spray painting. As shown in FIG. 6, the electrolyte powder, prepared as described above, is suspended in a solvent forming either a slurry, a gel, or a paint. This solution is then deposited onto an electrode or other surface by spray painting. The solution is spray painted by first atomizing the solution into droplets and forcing the droplets to impact the desired substrate. The substrate spins during spraying to ensure even coverage of the substrate with the atomized particles. The solvent evolves either in the process of spraying or after spraying by allowing the sprayed surface to dry between applications. This method yields very evenly distributed electrolyte layers having thicknesses ranging from sub-micron to tens of microns depending on the solution and spraying variables.

Water soluble solid acids can also be dissolved in an aqueous solution which is then spray painted onto the desired surface. The size of the particles deposited depends greatly on the degree of solvation, i.e. the more saturated the solution, the bigger the resulting sprayed particles. Particle size also depends on the size of the atomized droplets, i.e. high pressure carrier gas yields smaller droplets and small particles. In addition, particle size depends on the temperature of the surrounding atmosphere, i.e. higher temperatures yield faster water evaporation rates and smaller crystallites. Particle size also depends on the temperature of the sprayed surface, i.e. higher temperatures yield faster water evaporation rates and smaller crystallites. The water solvent evolves either in the process of spraying or after spraying by allowing the sprayed surface to dry between applications. This method also yields very evenly distributed electrolyte layers having thicknesses ranging from about 0.1 to about 100 microns depending on the solution and spraying variables.

D. Spin Coating

Spin coating can also be used to deposit solid acid electrolyte layers. Standard spin coating techniques can be used to deposit thin layers of slurries, gels, or aqueous solutions, as described above, of solid acid electrolytes on electrodes or other surfaces. Specifically, the electrolyte-containing solution is slowly dropped onto the desired surface, which surface sits in the center of a rapidly spinning cylinder. Centripetal force created by the spinning of the surface causes the solution to spread radially outwardly from the center of the surface, yielding a thin, uniformly distributed layer of electrolyte solution. Solutions with lower ratios of electrolyte to solvent create thinner layers. A dense, uniform electrolyte layer having a thickness from about 0.1 to about 100 microns can be achieved by drying the electrolyte layer between coatings and repeating the process.

E. Dip Casting

Solid acid electrolyte layers can also be deposited on the electrode or other surface by dip casting. According to this process, the electrolyte solution is deposited in the pores of a highly porous monolithic layer. Water soluble solid acids can be deposited by dipping the monolith into an aqueous solution of the solid acid and allowing the electrolyte particles to form in the monolith's pores as the water evaporates. Repetition of this process creates a highly dense electrolyte/monolith layer. Stable melt solid acids can be deposited into the pores of a highly porous monolithic layer by dipping the monolith in to the melt and allowing the electrolyte to crystallize. This dipping is repeated as necessary to create a highly dense electrolyte/monolith layer. Nonlimiting examples of suitable monolith layers include highly porous matrixes of thermal plastics, silica, and silicon carbide.

III. Electrolyte Layer Composition

Solid acid electrolytes can be mixed with secondary materials to form composites, which have improved thermo-mechanical properties. These composites can comprise either polymer composites or ceramic/glass composites.

A. Polymer Composites

To prepare solid acid electrolyte membranes having good flexibility, and that are less brittle, the solid acid electrolytes are mixed with high temperature thermoplastics. Nonlimiting examples of suitable thermoplastics include perfluorinated polymers, polybenzimidazole (PBI), fluoroelastomers, and polytetrafluoroethylene (PTFE), as disclosed in U.S. Pat. No. 6,468,684, entitled PROTON CONDUCTING MEMBRANE USING A SOLID ACID, the entire contents of which are incorporated herein by reference.

B. Ceramic/Glass Composites

Figure 7:
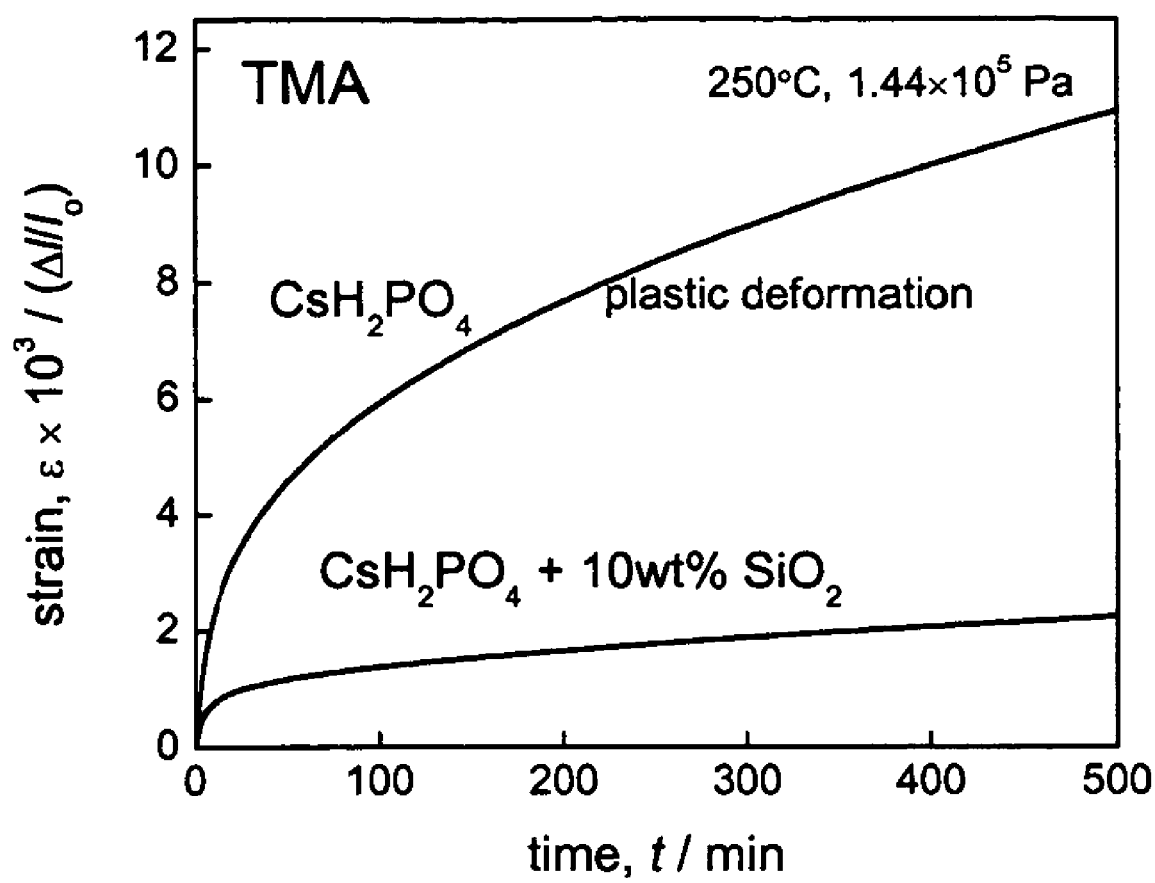
FIG. 7 is a graph comparing strain versus time measured at 250° C. for solid acid electrolyte materials according to alternative embodiments of the present invention.

Superprotonic solid acid electrolytes have unique physical properties in their superprotonic phases. Specifically, their physical properties in these phases resemble that of clay or plasticine. This "soft" phase is easily deformed, as shown in FIG. 7. FIG. 7 is a graph comparing the strain versus time of an exemplary CDP electrolyte with that of another exemplary CDP+SiO2 electrolyte. As shown in FIG. 7, the CDP+SiO2 electrolyte exhibits dramatically reduced stain over time. Therefore, secondary binder materials are advantageously added to the solid acid material to increase the mechanical rigidity of the solid acid. These secondary binder materials can comprise any typical ceramic or glass material, for example crystalline or amorphous $SiO_2$, $Al_2O_3$ or $TiO_2$.

Addition of the secondary ceramic or glass binder to the solid acid enables tailoring of the thermal expansion coefficient and the thermal-mechanical robustness of the electrolyte layer. For example, when 10% high surface area, i.e. 350 to 400 $m^2/g$, silica is added to CDP, the plastic deformation properties of the resulting membrane are improved by an order of magnitude, as shown in FIG. 3. The superprotonic conductivity of the CDP electrolyte has a non-linear dependence on the percent of high surface area $SiO_2$. For example, the conductivity of CDP/5% $SiO_2$ and CDP/10% $SiO_2$ are 50% and 10% that of pure CDP, respectively. Therefore, for fuel cell applications, only a modest amount of the secondary binder, e.g. between about 0.1 and about 5% high surface area $SiO_2$, should be added to the electrolyte so as not to inhibit proton conductivity. The $SiO_2$ has a particle size ranging from about 1 to about 100 nm.

IV. Electrocatalyst Layer Composition

The electrocatalyst layer of a high performance SAFC comprises fine particles of the solid acid electrolyte, an electrocatalyst such as Pt, and a pore-former such as naphthalene or ammonium carbonate. The pore-former is subsequently evolved to yield an electrocatalyst layer that is highly permeable to gasses such as the fuel and the oxidant.

Because SAFCs operate at intermediate temperatures of from about 150 to about 350° C. the catalyst loadings currently employed in low temperature fuel cells such as polymer electrolyte membrane fuel cells (PEMFCs), phosphoric acid fuel cells (PAFCs) and alkaline fuel cells (AFCs) can be dramatically reduced. In fact, the conventional Pt catalyst can even be replaced with less expensive alternatives. Nonlimiting examples of materials suitable for use as catalyst layers in SAFCs include noble metal catalysts, less expensive base metal catalysts and electrocatalytic ceramics.

A. Electrocatalysts

1. Noble Metal Catalysts

Nano-particles of noble metals such as Pt, Ru, Rh and Pd, and alloys of these catalysts, supported on either carbon or an oxide, and are high-performance anode and cathode fuel cell catalysts. Because solid acid electrolytes operate in the solid state, very small catalyst particles with high surface areas can be used without either being solvated by the electrolyte (as in PAFCs) or sintering together (which typically occurs above 400° C.). Both solvation by the electrolyte and sintering of the particles cause significant decreases in fuel cell performance. In addition, fuel cells in which these phenomena occur require larger particles and increased noble metal catalyst loadings in order to achieve the desired long-term performance objectives. Solid acid fuel cells do not suffer the limitations that these fuel cells do, and therefore do not experience these undesirable phenomena. In the absence of these phenomena, solid acid fuel cells take advantage of the high catalytic activity of noble metal nanoparticles.

2. Base Metal Catalysts

Base metal catalysts such as Cu, Ni, Ag, Au and Sn can serve as either an anode or a cathode catalyst, especially when supported on carbon or an oxide. In particular, first row transition metals such as Cu can serve as an anode catalyst. Nickel is a good high temperature, i.e. greater than 600° C., anode catalyst and may serve as an SAFC catalyst. Silver has been used on alkali fuel cell cathodes. When used with +1 or −1 oxidation state elements such as Cs or Cl to improve surface adsorption, silver can also serve as an SAFC cathode catalyst.

3. Ceramic Catalysts

Some ceramics, for example $FePO_4$ and WC, exhibit catalytic activity within the SAFC operation temperature range. In particular, lithium-doped iron phosphate can serve as an anode catalyst. In addition, mixed proton/electron conductors can serve as both anode and cathode catalysts. Also, metal catalysts supported on these catalytically active ceramics can dramatically decrease metal loadings while maintaining desired fuel cell performance objectives.

B. Catalyst Supports

To improve catalytic performance, the electrocatalyst can be supported on a catalyst support. Nonlimiting examples of suitable supports include metal or ceramic oxide supports, porous supports and carbon supports.

1. Oxide Supports

Certain ceramics and transition metal oxides such as $SiO_2$, $TiO_2$, ZnO, CuO, NiO, CoO, MnO and $SnO_2$ can serve as supports for metal catalysts. These ceramics and transition metal oxide supports enhance catalytic activity. The addition of these oxides improves catalytic performance of both the anode and cathode catalyst in SAFCS, thereby reducing overall catalyst loadings.

2. Porous Supports

Secondary porous components can also serve as catalyst supports. Nonlimiting examples of suitable porous supports include silicate zeolites, porous silicon and honeycombed anodized alumina. These porous supports allow gasses to reach the catalyst.

3. Carbon Supports

Carbon enhances catalytic properties of Pt, and can be used a catalyst support to reduce the overall catalyst loading in SAFCs. In addition, carbon supports increase electronic conduction and spillover of the catalyst layer.

C. Composites

The electrocatalyst layer can comprise any combination of noble metals, base metals, ceramic oxides and metal oxides supported on a metal oxide support, porous support and/or carbon support. Table 1, below, lists nonlimiting examples of suitable noble metals, base metals, ceramics and metal oxides, and supports for use as the catalyst in a SAFC.

TABLE 1

Catalyst Layer Compositions

| Noble Metals | Base Metals | Ceramics and Metal Oxides | Ceramic and Metal Oxide Supported | Porous Substrate and Carbon Supported |
|---|---|---|---|---|
| Pt | Ag | WC | Pt—WC | Pt-Silicate Zeolite |
| Ru | Ni | FePO$_4$ | Pt—FePO$_4$ | Pt-Honeycomb SiC |
| Rh | Co | Li$_x$Fe$_{1-x}$PO$_4$ | Pt—AlPO$_4$ | Pt-Foamed SiC |
| Pd | Sn | TiO$_2$ | Pt—LaPO$_4$ | Pt—Carbon |
| Au | | ZnO | Ni—AgO | Pt/Ru—Carbon |
| Ir | | CuO | Pt—TiO$_2$ | Ag—Carbon |
| | | NiO | Ag—SnO$_2$ | Pt—CNT* |
| | | CoO | Pt—SiC | Ag—CNT* |
| | | MnO | Ni—SiC | Ni—CNT* |
| | | SnO$_2$ | Ag—SiC | |

*Carbon Nano-Tubes

V. Catalyst Layer Preparation

Preparation of the catalyst layer involves maximizing catalyst surface area, gas diffusion, and catalyst-electrolyte-gas triple point junctions. Such catalyst layers are prepared by any suitable processing technique.

One exemplary technique comprises mechanically milling the catalyst, electrolyte, and pore-former together. Another method comprises finely dispersing the catalyst on the electrolyte by co-precipitating an organo-catalyst, such as Pt—(C$_2$H$_8$N$_2$)$_2$Cl$_2$, with the solid acid, applying the co-precipitate to at least one of the anode and cathode of the fuel cell, and subsequently burning off the organic after fabricating the membrane electrode assembly.

In addition, the electrocatalyst can be prepared by any method known in the art, as described in Provisional Application No. 60/578,652, entitled PROCESSING TECHNIQUES FOR THE FABRICATION OF SOLID ACID FUEL CELL MEMBRANE ELECTRODE ASSEMBLIES, filed Jun. 10, 2004, the entire content of which is incorporated herein by reference. for example, the electrocatalyst can also be prepared by organic decomposition.

High surface area SiO$_2$ can be added to the electrocatalyst layer in an amount of about 1 to about 20%. The addition of SiO$_2$ increases the adhesion of the catalyst layer to the electrolyte and prevents the electrolyte from creeping into the catalyst layer.

VI. Catalyst Layer Deposition

The catalyst layer is deposited on a gas diffusion layer/electrode by the methods described above with respect to the deposition of the electrolyte layer. Namely, the catalyst layer may be deposited by mechanical dispersion, slurry casting, spraying, spin coating, or dip casting. As these methods have been described above with respect to the deposition of the electrolyte layer, they are not described again here.

In addition, the electrocatalyst layer may deposited by any method known in the art, as described in Provisional Application No. 60/578,652, entitled PROCESSING TECHNIQUES FOR THE FABRICATION OF SOLID ACID FUEL CELL MEMBRANE ELECTRODE ASSEMBLIES, filed Jun. 10, 2004, the entire content of which is incorporated herein by reference. For example, the catalyst layer can also be deposited by sputter coating or potential-step deposition.

VII. Gas-Diffusion Electrode Preparation

Any known gas diffusion electrodes can be used with the present invention, as described in Provisional Application No. 60/578,652, entitled PROCESSING TECHNIQUES FOR THE FABRICATION OF SOLID ACID FUEL CELL MEMBRANE ELECTRODE ASSEMBLIES, filed Jun. 10, 2004, the entire content of which is incorporated herein by reference. For example, porous ceramics, such as zeolites, or reduced metal oxides can be used as the gas diffusion electrodes with the SAFCs of the present invention. Specifically, a two-layered stainless steel mesh having one side with 10 micron holes (sold under the trade name Dynapore® p/n 400510 by Martin Kurz & Co., Inc., Mineola, N.Y.) is a good gas diffusion electrode for use with SAFCs.

VIII. Gas-Seal Fabrication

Sealing the MEA prevents gas from crossing over from the anode to cathode and vice versa. Sealing the MEA in this fashion creates a high performance SAFC. Various types of seals can be used, such as solid acid-glass, plastics, silicones and ceramics. Solid acid-glass seals work well because solid acids form strong bonds with glass (SiO$_2$). Therefore, melting solid acids in glass rings forms robust gas-tight seals.

Thermoplastics, such as polytetrafluoroethylene (PTFE) and Viton®, as well as silicones, can also serve as gas-tight seals for SAFCs operating at about 150 to about 300° C.

Ceramics, such as quartz, alumina and the like, can also serve as gas-seals for SAFCs operating at about 150 to about 300° C.

IX. MEA Fabrication and Processing

Figure 1:
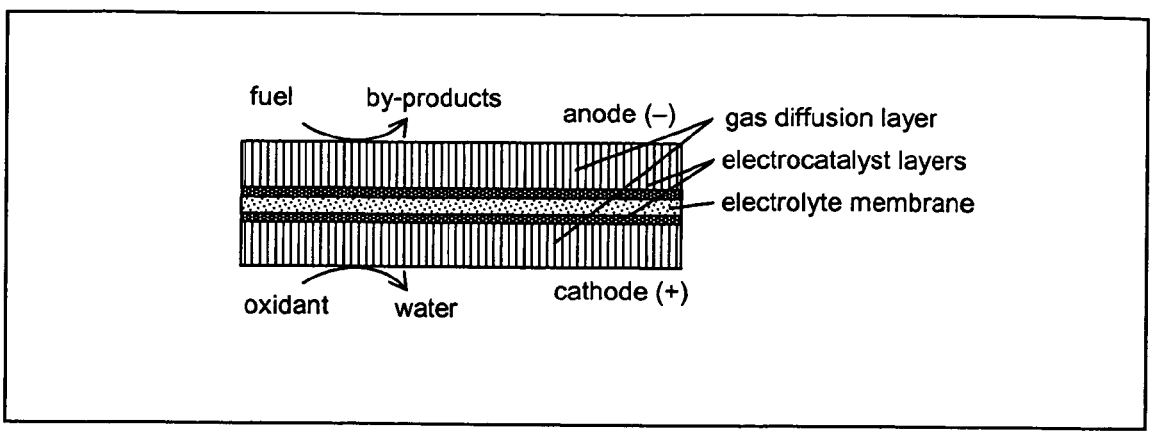
FIG. 1 is a schematic depicting a fuel cell membrane electrode assembly (MEA) according to the prior art.
Figure 1A:
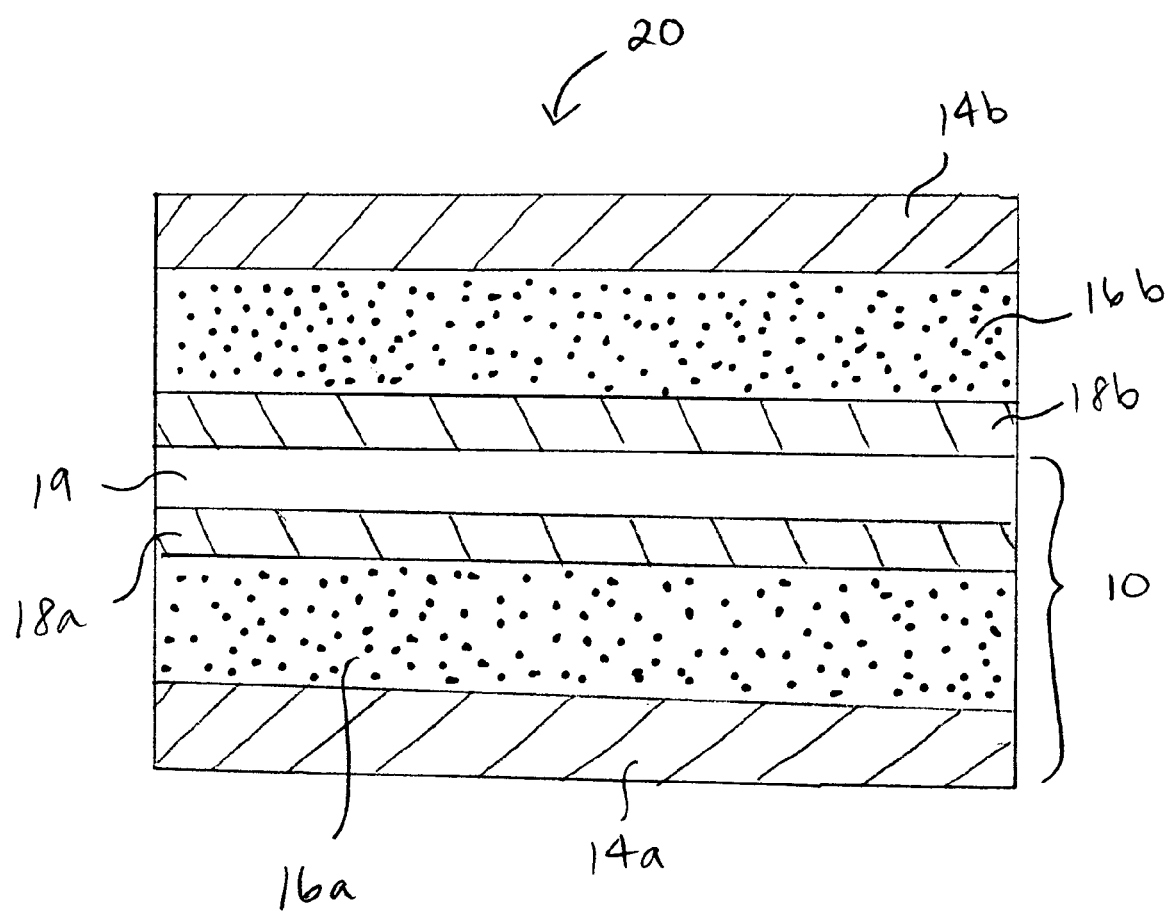
FIG. 1a is a schematic depicting a fuel cell membrane electrode assembly (MEA) according to one embodiment of the present invention.

After deposition of the electrocatalyst layers on the gas diffusion layers, which may comprise metal mesh or any other suitable material, and after deposition of the electrolyte on one of the electrocatalyst layers to form a half cell, the final membrane electrode assembly (MEA) is formed. The MEA is formed by first painting a sealant 12 around the edge of the half cell 10, as shown in FIG. 1b. The half cell 10 comprises a first electrode 14a, a first electrocatalyst layer 18a, a first gas diffusion layer 16a, and an electrolyte layer 19. Although FIG. 1b depicts a gas diffusion layer separate from the electrode, it is understood that the gas diffusion layer and the electrode can comprise a unitary construction. The membrane electrode assembly 20, shown in FIG. 1a, comprises the half cell 10, a second electrode 14b, a second electrocatalyst layer 18b and a second gas diffusion layer 16b. The membrane electrode assembly 20 is formed by uni-axially pressing the half cell 10 to the other components of the MEA at about 10 to about 20 MPa to ensure good contact between the electrolyte and the electrocatalyst layers. The resulting MEA 20 is again sealed around the edge to form a gas-tight seal.

The following Examples illustrate the exemplary processing techniques described above. However, these Examples are presented for illustrative purposes only, and are not to be construed as limiting the invention.

EXAMPLE 1

A saturated solution of CsH$_2$PO$_4$ in water having a concentration greater than 4 M was injected with a syringe into a methanol solvent while being agitated by an ultra-sonicator causing massive precipitation of CsH$_2$PO$_4$ particles having sizes ranging from 1 to 10 microns. After allowing the particles to settle for about 1 day, the methanol was poured off. This was repeated twice more. The $CsH_2PO_4$ particles were then decanted with toluene three times. The resulting $CsH_2PO_4$ fine particles were then dried at 100 to 150° C.

EXAMPLE 2

A saturated solution of $CsH_2PO_4$ in water having a concentration greater than 4 M was sprayed through a flame having a temperature greater than 600° C. The water rapidly evaporated and nano-particles of $CSPO_3$ formed via the reaction: $CsH_2PO_4(aq)+heat \rightarrow CsPO_3(s)+H_2O(q)$. The resulting nano-sized particles of $CsPO_3$ were then placed in a humidified atmosphere having a $p_{H2O}$ greater than 0.3 atm at temperatures of 25 to 200° C. This caused a reverse reaction (or hydration) of the $CsPO_3$ nano-particles, thereby forming nano-particles of $CsH_2PO_4$ via the reaction: $CsPO_3(s)+H_2O(q) \rightarrow CsH_2PO_4(s)$.

EXAMPLE 3

A powder of $CsH_2PO_4$ was mixed with high surface area $SiO_2$. The $SiO_2$ had a surface area of 350 to 400 $m^2/g$. The resulting mixture was then used to form the electrolyte layer, which was then deposited on the electrode by slurry casting. The powder was then uniaxially pressed at a pressure of 10 to 60 MPa into a dense (i.e. greater than 97%) electrolyte membrane and used as the electrolyte layer of a fuel cell.

EXAMPLE 4

A powder of $CsH_2PO_4$ was mixed with high surface area $SiO_2$. The $SiO_2$ had a surface area of 350 to 400 $m^2/g$. The resulting mixture was then used to form the electrolyte layer, which was then deposited on the electrode by spray painting. The powder was then uniaxially pressed at a pressure of 10 to 60 MPa into a dense (i.e. greater than 97%) electrolyte membrane and used as the electrolyte layer of a fuel cell.

EXAMPLE 5

A powder of $CsH_2PO_4$ was mixed with high surface area $SiO_2$. The $SiO_2$ had a surface area of 350 to 400 $m^2/g$. The resulting mixture was then used to form the electrolyte layer, which was then deposited on the electrode by dip casting. The powder was then uniaxially pressed at a pressure of 10 to 60 MPa into a dense (i.e. greater than 97%) electrolyte membrane and used as the electrolyte layer of a fuel cell.

EXAMPLE 6

A powder of $CsH_2PO_4$ was mixed with high surface area $SiO_2$. The $SiO_2$ had a surface area of 350 to 400 $m^2/g$. The resulting mixture was then used to form the electrolyte layer, which was then deposited on the electrode by mechanical dispersion. The powder was then uniaxially pressed at a pressure of 10 to 60 MPa into a dense (i.e. greater than 97%) electrolyte membrane and used as the electrolyte layer of a fuel cell.

EXAMPLE 7

A powder of $CsH_2PO_4$ was mixed with high surface area $SiO_2$. The $SiO_2$ had a surface area of 350 to 400 $m^2/g$. The resulting mixture was then used to form the electrolyte layer, which was then deposited on the electrode by spin coating. The powder was then uniaxially pressed at a pressure of 10 to 60 MPa into a dense (i.e. greater than 97%) electrolyte membrane and used as the electrolyte layer of a fuel cell.

EXAMPLE 8

A fine electrolyte powder having a particle size of less than 1 micron was sifted or sprinkled over the electrode layer. The resulting layer of loose powder was then leveled-off to the top of the collar, leaving an evenly dispersed layer of loose powder, ready to be uniaxially pressed or otherwise compressed and used as a fuel cell electrolyte membrane.

EXAMPLE 9

A coarse electrolyte powder of $CsH_2PO_4$ having a particle size of 10 to 100 microns was mechanically mixed by a mortar and pestle in toluene for 5 to 10 minutes. The resulting slurry had a volume of about five times that of loose powder. This slurry remains stable as long as the toluene does not evolve. The slurry was deposited with a pipette onto the flat surface of the plunger of a cylindrical die. The plunger was then depressed from the surface of the collar. After leveling the surface of the slurry with a straight edge (i.e. razor blade), the entire volume within the die (from the surface of the plunger to the surface of the collar) was filled evenly with the slurry mixture. The die was then allowed to stand for 15 to 20 minutes (or less if placed under a heat lamp or in an oven at slightly elevated temperatures, e.g. 40 to 50° C.) to allow the toluene to evolve.

EXAMPLE 10

Fine electrolyte particles having particle sizes of 0.1 to 1 microns were dispersed within a methanol solution and agitated, i.e. shaken violently or ultra-sonicated. The agitated solution was then mixed with an equal volume of toluene and further agitated to mix the polar and non-polar solvents, thereby creating a highly dispersed gel having low density. This low density gel is ideal for depositing very thin electrolyte layers, for example electrolyte layers having thicknesses less than 20 microns.

To deposit a thicker layer, the resulting solution was allowed to stand for 12 hrs until the electrolyte gel settled on the bottom of the container. The clear solvent portion of the solution was then removed and replaced with more toluene. The resulting solution was agitated and allowed to stand for 4 hrs until the electrolyte gel, now having high density, settled to the bottom. This gel had approximately twice the density of the highly dispersed gel described above.

The resulting gel (either low or high density) was then deposited with a pipette onto the flat surface of the plunger of a cylindrical die. The plunger which was depressed from the surface of the collar. After leveling the surface of the slurry with a straight edge (i.e. razor blade), the entire volume within the die (from the surface of the plunger to the surface of the collar) was filled evenly with the slurry mixture. The die was then allowed to stand for 15 minutes (or less if placed under a heat lamp or in an oven at slightly elevated temperatures, i.e. 40 to 50° C.) to allow the toluene to evolve. The gel was then pressed at 10 to 60 MPa into a dense electrolyte layer.

EXAMPLE 11

A slurry was prepared containing 1 g of fine particles of $CsH_2PO_4$ (having a particle size of about 1 micron) per 20 ml of toluene. The slurry was agitated and then sprayed onto an electrode using a conventional air brush with nitrogen carrier gas at a pressure of about 40 psi. The surrounding atmosphere and electrode surface was heated to about 60° C. with a standard infra-red heating lamp held approximately 12 inches (vertically) from the surface of the electrode. The air brush was held at an angle of about 60° from the surface of the electrode while the electrode was rotated to give an even distribution of deposited electrolyte particles. The resulting powder layer was then pressed at 10 to 60 MPa into a dense electrolyte layer

EXAMPLE 12

An aqueous solution of $CsH_2PO_4$ having a concentration of 4 M or greater was sprayed onto an electrode using a conventional air brush with nitrogen carrier gas at a pressure of 60 psi. The surrounding atmosphere and electrode surface was heated to about 60° C. with a standard infra-red heating lamp held approximately 12 inches (vertically) from the surface of the electrode. The air brush was held at an angle of about 60° from the surface of the electrode while the electrode was rotated to give an even distribution of deposited electrolyte particles. The spray from the air brush was turned on for 1 second and then off for 10 seconds to allow all the water to evaporate before the next layer of droplets was deposited onto the surface of the electrode.

EXAMPLE 13

A dilute aqueous solution of $CsH_2PO_4$ having a concentration of 0.1 to 1.0 M, and a 50 micron thick layer of 50% porous yttrium stabilized zirconium, YSZ were prepared. The YSZ was placed into the solution and agitated in an ultra-sonicator for about one minute. The YSZ monolith was removed from the solution and allowed to dry in an oven at 50° C. for ten minutes. This process was then repeated ten times. The resulting electrolyte/YSZ layer had a porosity of less than 4%.

EXAMPLE 14

Two hundred grams of $CsH_2PO_4$ powder were melted in a glass beaker at a temperature of 350° C. A water partial pressure ($P_{H2O}$) of greater than 0.5 atm was exhibited over the melt to stabilize it against dehydration. A 40 micron thick layer of 60% porous silicate zeolite was placed into the melt for 30 minutes and the melt was shaken with glass tongs every 5 minutes. The silicate zeolite was removed from the melt and placed on a flat surface to allow the electrolyte to crystallize within the pores of the zeolite. The resulting electrolyte/zeolite layer had a porosity of less than 3%.

EXAMPLE 15

Platinum particles having particle sizes of 1 to 10 nanometers were precipitated on silica particles having particle sizes of 50 to 100 nanometers using platinum-chloride-nitrate solution.

The resulting silica supported catalyst exhibited a 40% increase in performance versus pure platinum black having particle sizes of about 100 nanometers, and the platinum loading for this silica supported catalyst was five fold less than that of the pure platinum black catalyst.

EXAMPLE 16

Nickel particles having particle sizes of 4 to 10 nanometers was used instead of platinum as the anode catalyst. The anode over-potential was increased by only about 30 mV at a current density of about 200 mA/cm$^2$. The nickel particles can be supported on aluminum oxide, carbon, or cobalt to decrease their tendency to sinter and oxidize.

EXAMPLE 17

Nickel particles having particle sizes of 4 to 10 nanometers were precipitated on aluminum oxide to give a cathode catalyst for a $CsH_2PO_4$ fuel cell. This catalyst was mixed with carbon black to make the electrocatalyst mixture.

The resulting cathode over-potential shows only a 20% increase at a current density of 200 mA/cm$^2$ when compared to a cathode catalyst mix using platinum particles having particle sizes of 100 nanometers. Thus, for a small decrease in performance, the cost of the fuel cell can be dramatically reduced by replacing platinum with silver on the cathode.

EXAMPLE 18

Five grams of a silver and tin alloy (1:2 mol ratio Ag:Sn) was attritor milled for 5 h at 500 rpm in isopropanol using 30 g of zirconia balls 1 mm in diameter. The resulting sub-micron powder having particle sizes of 0.1 to 1.0 microns was ground with carbon black and $CsH_2PO_4$ to give a cathode catalyst mix. The silver/tin particles both have high absorption and conduction rates for oxygen, leading to a cathode over-potential only 25% higher at 200 mA/cm$^2$ than that of a catalyst mix using platinum particles having particle sizes of 100 nanometers.

EXAMPLE 19

Porous anodized alumina (PAA) was electrochemically coated with silver to make a conductive surface. Platinum having a particle size of 20 to 100 nanometers was then deposited on the surface of the PAA pores to a Pt loading of 0.1 mg/cm$^2$ on both the anode and the cathode.

This activated PAA electrode exhibited a 10% increase in peak power density when used as anode and cathode catalysts in a $CsH_2PO_4$ SAFC having an electrolyte thickness of 30 microns when compared to a vulcanized platinum catalyst comprising 40% by weight Pt on carbon black particles having a particle size of 100 nanometers with a Pt loading of 1 mg/cm$^2$. Therefore, use of PAA electrodes decreases Pt loadings ten fold, while also increasing the MEA performance.

EXAMPLE 20

A forty weight percent platinum/ruthenium alloy having a particle size of 10 to 50 nanometers supported on carbon was mixed with $CsH_2PO_4$, carbon black, and naphthalene at a 3:3:1:1 weight ratio. The resulting electrocatalyst mix was used in a $CsH_2PO_4$ fuel cell operated at 250° C. with a 20 to 50% methanol/water fuel stream at the anode and pure oxygen at the cathode. When used in this fuel cell, the electrocatalyst mix exhibited a 30% increase in performance as compared to a catalyst mix using an unsupported platinum/ruthenium alloy.

EXAMPLE 21

Platinum particles 30 to 70 nanometers in diameter were deposited on carbon nano-tubes 50 to 70 nanometers in diameter and 3 to 4 microns in length using a standard three-electrode cell by the potential-step deposition method. This method used $N_2$ saturated with an aqueous solution of 7.7 mM $H_2PtCl_6$ and 0.5 M HCl. These Pt covered carbon nanotubes were deposited to a total cathode Pt loading of 0.1 mg/cm$^2$ and exhibited a 25% decrease in cathode over-potential compared to vulcanized platinum, which comprises platinum particles having particle sizes of 40 to 50 nanometers deposited on carbon black having a particle size of 100 to 130 nanometers.

These Pt-covered carbon nanotubes were deposited on an anode of a $CsH_2PO_4$ SAFC to a Pt loading 0.1 mg/cm$^2$, and the fuel cell had an electrolyte thickness of 30 microns. The MEA constructed using these Pt-covered carbon nanotubes exhibited a 15% increase in peak power density compared to a MEA using the standard vulcanized Pt as the cathode catalyst.

EXAMPLE 22

A mixture of 10% Pt—C and naphthalene in a weight ratio of 5:1 was mechanically milled at 60 rpm for 3 hrs to achieve good homogeneity. The resulting electrocatalyst mix was mechanically dispersed onto the surface of a stainless steel wire mesh, placed in a cylindrical pellet die where it was spread evenly over the surface of the mesh. The powder was then densified and attached to the wire mesh by pressing at 40 to 60 MPa. This mesh/electrocatalyst mix combination can serve as either an anode or cathode in a SAFC.

EXAMPLE 23

An electrocatalyst mix comprising a 3:3:1:1 weight ratio of $CsH_2PO_4$:Pt-black:C (40% Pt):naphthalene was stirred into a solution containing acetone and methanol in a 3:1 volume ratio. The resulting mixture was ultra-sonicated for 30 minutes to evenly disperse the solids in the solvents. The resulting electrocatalyst paint was then spray painted onto a porous stainless steel disk until a 5 micron thick layer of the electrocatalyst mixture (~1 mg/cm$^2$ of Pt) was evenly deposited over the entire surface. The electrocatalyst layer comprised about 1 mg/cm$^2$ Pt.

EXAMPLE 24

An electrocatalyst mix comprising a 3:1:1 weight ratio of Pt-black:C (40% Pt):naphthalene was mechanically ground for 10 minutes in toluene. The volume ratio of the electrocatalyst mix to toluene was 1:200. The resulting mixture was ultra-sonicated for 30 minutes to evenly disperse the solids in the solvent. The resulting electrocatalyst slurry was then pippetted into a cylindrical die. The toluene was allowed to evolve. A porous, stainless steel disk was then placed on top and pressed onto the electrocatalyst mix at 10 to 60 MPa. The stainless steel disk, with the electrocatalyst mix attached, was then removed from the die. This disk can serve as either an anode or cathode.

EXAMPLE 25

An electrocatalyst mix comprising a 3:1:1 weight ratio of Pt black:C (40% Pt):naphthalene was mechanically ground for 10 minutes in benzene. The volume ratio of the electrocatalyst mix to benzene was 1:60. The resulting mixture was ultra-sonicated for 30 minutes to evenly disperse the solids in the solvent. The resulting electrocatalyst slurry was then pippetted onto a porous stainless steel disk, which was then placed in the middle of a spin coater. The benzene from the slurry was allowed to evolve for 1 minute before another ⅕ ml was pippetted onto the disk. This process was repeated three more times to give five layers of electrocatalyst mix. The total thickness of the electrocatalyst layer was 20 microns, and the resulting electrocatalyst layer was evenly dispersed on the stainless steel disk.

EXAMPLE 26

An electrocatalyst mix comprising a 2:1:1 weight ratio of Pt:C (10% Pt):naphthalene was mechanically ground for 10 minutes in benzene. The volume ratio of the electrocatalyst mix to benzene was 1:60. The resulting mixture was ultra-sonicated for 30 minutes to evenly disperse the solids in the solvent, and to dissolve the naphthalene. A stainless steel wire mesh was then dipped into the agitated solution and allowed to dry by evolution of the benzene. This process was repeated three more times, resulting in about 30 mg of the electrocatalyst mix being evenly deposited on the wire mesh.

EXAMPLE 27

A $CsH_2PO_4$ SAFC was fabricated by uni-axially pressing, in pellet die, a platinum containing anode and cathode onto 100 mg of mechanically dispersed $CsH_2PO_4$ powder at 10 to 60 MPa to form a MEA. A cylindrical glass ring was then placed around the circumference of the MEA. The MEA was vertically positioned in the middle of the ring and a methane flame was then passed over the outside of the ring at 5 rpm. This melted the $CsH_2PO_4$ around the first 0.1 mm of the outside of the MEA, which then bonded to the $SiO_2$ in the glass ring to form an impermeable gas seal.

EXAMPLE 28

A $CsH_2PO_4$ electrolyte layer was attached to one electrode, and the half cell was then painted around its perimeter with a fluorinated thermoplastic such as Viton®, creating a 1 mm thick ring around the edge of half cell. The thermoplastic was allowed to cure for about 4 hrs and the other electrode was then attached to the half cell by uni-axial pressing at about 1 MPa. The resulting MEA was then painted around its edge with the thermoplastic to complete the sealing of the MEA.

EXAMPLE 29

A $CsH_2PO_4$ electrolyte layer was attached to an electrode, and the half cell was then painted around its perimeter with a silicone sealant such as Aremco-Seal™ 4030, creating a 1 mm thick ring around edge of the half cell. The sealant was allowed to cure for about 4 hrs and the other electrode was then attached to the half cell by uni-axial pressing at about 1 MPa. The resulting MEA was then painted around its edge with the silicone sealant to complete the sealing of the MEA.

EXAMPLE 30

A $CsH_2PO_4$ electrolyte layer was attached to an electrode, and the half cell was then painted around its perimeter with a fluorinated polymer such as PTFE, creating a 1 mm thick ring of thermoplastic around edge of half cell. The fluorinated polymer comprised particles having sizes of 10 to 40 nanometers dispersed in an organic solvent. The solvent was evolved from the PTFE ring and the ring was then attached to the half cell by uni-axial pressing at about 1 MPa. The counter electrode was similarly painted with the plastic and uni-axially pressed onto the half cell. The resulting MEA was then painted around its edge with PTFE and re-pressed in the die to complete the sealing of the MEA.

EXAMPLE 31

A $CsH_2PO_4$ electrolyte layer was attached to an electrode, and the half cell was wrapped with PTFE tape around its perimeter. The PTFE tape was 1 mm in width and 10 microns thick. This created a 0.5 mm thick ring of PTFE around the edge of the half cell. The half cell was then placed in a cylindrical pellet die and pressed at about 1 MPa. This caused the PTFE to seal to the $CsH_2PO_4$ on the surface of the half cell. Another electrode was then attached to the half cell by uni-axial pressing at about 1 MPa. The resulting MEA was then wrapped with PTFE tape around its edge and pressed again in the die. This sealed the first and second layers of PTFE together, making a gas-tight seal for the MEA.

EXAMPLE 32

A $CsH_2PO_4$ electrolyte layer was attached to an electrode, and the half cell was then painted around its perimeter with a ceramic sealant such as Quartz Coat™ 850, creating a 1 mm thick ring around edge of the half cell. The ceramic sealant was allowed to cure for about 4 hrs at 150° C. The counter electrode was similarly painted with the ceramic sealant and uni-axially pressed onto the half cell. The resulting MEA was then painted around its edge with the ceramic sealant to complete the sealing of the MEA.

The preceding description has been presented with reference to exemplary embodiments of the invention. Workers skilled in the art and technology to which this invention pertains will appreciate that alterations and modifications may be made to the described embodiments without meaningfully departing from the principal, spirit and scope of this invention. Accordingly, the foregoing description should not be read as pertaining only to the precise embodiments described, but rather should be read as consistent with, and as support for, the following claims, which are to have their fullest and fairest scope.

What is claimed is:

1. A method for making an electrolyte material for a solid acid fuel cell, the method comprising: providing a solid acid material; dissolving the solid acid material in water to form a saturated aqueous solution; injecting the saturated aqueous solution into a solvent in which the solid acid is not soluble to form an injection solution, wherein the solvent is selected from the group consisting of methanol, ethanol, isopropanol, benzene, toluene or acetone; allowing the injection solution to stand for at least one day to allow the solid acid material to settle in the solvent, creating a settled solution; decanting the settled solution with a slightly polar solvent selected from the group consisting of methanol, ethanol, isopropanol and butanol to isolate the solid acid particles.

2. The method according to claim 1, wherein the solid acid particles have particle sizes ranging from about 0.1 to about 1 micron.

3. The method according to claim 1, wherein the solid acid material comprises $CsH_2PO_4$.

4. The method according to claim 1 wherein the decanting step is repeated at least once.

5. A method for making an electrolyte material for a solid acid fuel cell, the method comprising: providing an aqueous solution of a solid acid material; spraying the solution through a heat source selected from the group consisting of a laser beam and a flame, creating particles of a solid acid byproduct; placing the solid acid byproduct particles in an atmosphere having a relative humidity ranging from about 30 to about 100% and a temperature ranging from about 25 to about 200° C. whereby the humidity of the atmosphere hydrates the solid acid byproduct creating solid acid particles.

6. The method according to claim 5, wherein the solid acid particles have particle sizes ranging from about 10 nm to about 0.1 microns.

7. The method according to claim 5, wherein the solid acid material comprises $CsH_2PO_4$.

8. The method according to claim 5, wherein the solid acid byproduct is allowed to stand in the humid atmosphere for a length of time ranging from about 1 hour to about 1 day.

9. A method of depositing an electrolyte on a substrate, the method comprising: preparing solid acid electrolyte particles according to the method of claim 1; sifting the particles onto the substrate; leveling the particles on the substrate; and flattening the particles on the substrate.

10. The method according to claim 9, wherein the sifting, leveling and flattening steps are repeated at least once.

11. A method of depositing an electrolyte on a substrate, the method comprising: preparing solid acid electrolyte particles according to the method of claim 1; mixing the solid acid electrolyte particles with an organic solvent to form a slurry and continuing to mix the slurry until the particles remain dispersed in the solvent without settling out of the solvent for a length of time ranging from about 1 minute to about 1 day; applying the slurry to the substrate; and allowing the solvent to evolve.

12. The method according to claim 11, wherein the slurry is applied to the substrate by the technique selected from the group consisting of pouring, tape casting and ink-jet-like deposition.

13. The method according to claim 11, wherein the organic solvent is selected from the group consisting of oxygenated solvents, hydrocarbon solvents, halogenated solvents, and chlorinated solvents.

14. The method according to claim 11, further comprising leveling the slurry on the substrate.

15. A method of depositing an electrolyte on a substrate, the method comprising: preparing solid acid electrolyte particles according to the method of claim 1; dispersing the solid acid electrolyte particles in a polar solvent to form a first dispersion; mixing the first dispersion with a non-polar solvent to form a stable gel; depositing the gel onto the substrate; and allowing the solvents to evolve.

16. The method according to claim 15, wherein the gel is deposited on the substrate by a technique selected from the group consisting of pouring, tape casting and ink-jet-like deposition.

17. The method according to claim 15, further comprising leveling the gel on the substrate.

18. A method of depositing an electrolyte on a substrate, the method comprising: preparing solid acid electrolyte particles according to the method of claim 1; preparing an aqueous solution of the solid acid electrolyte particles in water; depositing the aqueous solution on the substrate; and allowing the water to evolve.

19. A method of depositing an electrolyte on a substrate, the method comprising: preparing solid acid electrolyte particles according to the method of claim 1; suspending the solid acid electrolyte particles in a solvent to form a suspension; spraying the suspension onto the substrate; and allowing the solvent to evolve.

20. The method according to claim 19, wherein the spraying allowing the solvent to evolve steps are repeated at least once.

21. The method according to claim 19, wherein the solvent is selected from the group consisting of organic solvents and water.

22. A method of depositing an electrolyte on a substrate, the method comprising: preparing solid acid electrolyte particles according to the method of claim 1; suspending the solid acid electrolyte particles in a solvent to form a suspension; depositing the suspension in the center of the substrate, wherein the substrate is continuously spinning to create centripetal force and whereby the centripetal force spreads the suspension radially outwardly from the center of the substrate to distribute the suspension over the entire substrate.

23. The method according to claim 22, wherein the depositing step is repeated at least once.

24. The method according to claim 22, wherein the solvent is selected from the group consisting of organic solvents and water.

25. A method of depositing an electrolyte on a substrate, the method comprising: preparing solid acid electrolyte particles according to the method of claim 1; suspending the solid acid electrolyte particles in a solvent to form a suspension; dipping a porous monolith into the suspension; and allowing the solvent to evaporate.

26. The method according to claim 25, wherein the dipping and allowing the solvent to evaporate steps are repeated at least once.

27. The method according to claim 25, wherein the porous monolith is selected from the group consisting of porous matrixes of thermal plastics, silica and silicon carbide.

28. The method according to claim 1, further comprising mixing the solid acid material with a secondary binder material before dissolving the material in water.

29. The method according to claim 28, wherein the secondary binder material comprises a material selected from the group consisting of high temperature thermoplastics, ceramics and glasses.

30. The method according to claim 28, wherein the secondary binder material is selected from the group consisting of perfluorinated polymers, polybenzimidazole, fluoroelastomers, polytetrafluoroethylene, crystalline $SiO_2$, amorphous $SiO_2$, crystalline $Al_2O_3$, amorphous $Al_2O_3$, crystalline $TiO_2$ and amorphous $TiO_2$.

31. The method according to claim 28, wherein the secondary binder material comprises $SiO_2$.

32. The method according to claim 31, wherein the $SiO_2$ is present in an amount of about 5% or less based on the total amount of solid acid material.

33. The method according to claim 31, wherein the solid acid material comprises $CsH_2PO_4$.

34. The method according to claim 32, wherein the solid acid material comprises $CsH_2PO_4$.

35. A method of preparing particles of an electrocatalyst layer for a solid acid fuel cell, the method comprising: preparing a mixture of a solid acid electrolyte material, a catalyst material and a pore-former; and milling the mixture.

36. The method according to claim 35, wherein the mixture further comprises $SiO_2$.

37. The method according to claim 36, wherein the $SiO_2$ is present in an amount of about 1 to about 20 wt % based on the total weight of the electro catalyst.

38. A method of preparing particles of an electrocatalyst layer for a solid acid fuel cell, the method comprising: co-precipitating an organo-catalyst with a solid acid electrolyte material to form a co-precipitate; applying the co-precipitate to at least one of an anode and cathode of the fuel cell; and burning off the organic component of the organo-catalyst.

39. A method of depositing an electrocatalyst on a substrate, the method comprising: preparing particles of an electrocatalyst according to the method of claim 35; sifting the particles onto the substrate; leveling the particles on the substrate; and flattening the particles on the substrate.

40. The method according to claim 39, wherein the sifting, leveling and flattening steps are repeated at least once.

41. A method of depositing an electrocatalyst on a substrate, the method comprising: preparing particles of an electrocatalyst according to the method of claim 35; mixing the electrocatalyst particles with an organic solvent to form a slurry and continuing to mix the slurry until the particles remain dispersed in the solvent without settling out of the solvent for a length of time ranging from about 1 minute to about 1 day; applying the slurry to the substrate; and allowing the solvent to evolve.

42. The method according to claim 41, wherein the slurry is applied to the substrate by a technique selected from the group consisting of pouring, tape casting and ink-jet-like deposition.

43. The method according to claim 41, wherein the organic solvent is selected from the group consisting of oxygenated solvents, hydrocarbon solvents, halogenated solvents and chlorinated solvents.

44. The method according to claim 41, further comprising leveling the slurry on the substrate.

45. A method of depositing an electrocatalyst on a substrate, the method comprising: preparing particles of an electrocatalyst according to the method of claim 35; dispersing the electrocatalyst particles in a polar solvent to form a first dispersion; mixing the first dispersion with a non-polar solvent to form a stable gel; depositing the gel onto the substrate; and allowing the solvents to evolve.

46. The method according to claim 45, wherein the gel is deposited on the substrate by a technique selected from the group consisting of pouring, tape casting and ink-jet-like deposition.

47. The method according to claim 45, further comprising leveling the gel on the substrate.

48. A method of depositing an electrocatalyst on a substrate, the method comprising: preparing an electrocatalyst according to the method of claim 35; preparing an aqueous solution of the electrocatalyst particles in water; depositing the aqueous solution on the substrate; and allowing the water to evolve.

49. A method of depositing an electrocatalyst on a substrate, the method comprising: preparing an electrocatalyst according to the method of claim 35; suspending the electrocatalyst particles in a solvent to form a suspension; spraying the suspension onto the substrate; and allowing the solvent to evolve.

50. The method according to claim 49, wherein the spraying and allowing the solvent to evolve steps are repeated at least once.

51. The method according to claim 49, wherein the solvent is selected from the group consisting of organic solvents and water.

52. A method of depositing an electrocatalyst on a substrate, the method comprising: preparing an electrocatalyst according to the method of claim 35; suspending the electrocatalyst particles in a solvent to form a suspension; depositing the suspension in the center of the substrate, wherein the substrate is continuously spinning to create centripetal force and whereby the centripetal force spreads the suspension radially outwardly from the center of the substrate to distribute the suspension over the entire substrate.

53. The method according to claim 52, wherein the depositing step is repeated at least once.

54. The method according to claim 52, wherein the solvent is selected from the group consisting of organic solvents and water.

55. A method of depositing an electrocatalyst on a substrate, the method comprising: preparing an electrocatalyst according to the method of claim 35; suspending the electrocatalyst particles in a solvent to form a suspension; dipping a porous monolith into the suspension; and allowing the solvent to evaporate.

56. The method according to claim 55, wherein the dipping and allowing the solvent to evaporate steps are repeated at least once.

57. The method according to claim 55, wherein the porous monolith is selected from the group consisting of porous matrixes of thermal plastics, silica and silicon carbide.

58. A method of sealing a fuel cell comprising a solid acid electrolyte layer and a glass layer, the method comprising melting the solid acid layer to the glass layer, thereby creating a gas tight seal.

59. The method according to claim 58, wherein the glass is selected from the group consisting of quartz and amorphous $SiO_2$.

* * * * *

UNITED STATES PATENT AND TRADEMARK OFFICE
CERTIFICATE OF CORRECTION

PATENT NO. : 7,250,232 B2 Page 1 of 1
APPLICATION NO. : 11/150335
DATED : July 31, 2007
INVENTOR(S) : Boysen et al.

It is certified that error appears in the above-identified patent and that said Letters Patent is hereby corrected as shown below:

Column 1, line 14, add:

-- STATEMENT AS TO RIGHTS TO INVENTIONS MADE UNDER FEDERALLY SPONSORED RESEARCH OR DEVELOPMENT

This invention was made with Government support under Grant No. DMR-0413946 awarded by the National Science Foundation. The U.S. Government has certain rights in this invention. --

Signed and Sealed this

Twenty Second Day of April, 2008

JON W. DUDAS
*Director of the United States Patent and Trademark Office*